(12) United States Patent
Strømme

(10) Patent No.: US 12,715,694 B2
(45) Date of Patent: Aug. 25, 2026

(54) TRASH HANDLING ARRANGEMENT FOR AN AUTOMATED STORAGE SYSTEM

(71) Applicant: AutoStore Technology AS, Nedre Vats (NO)

(72) Inventor: Erik Strømme, Borgen (NO)

(73) Assignee: AutoStore Technology AS, Nedre Vats (NO)

( * ) Notice: Subject to any disclaimer, the term of this patent is extended or adjusted under 35 U.S.C. 154(b) by 263 days.

(21) Appl. No.: 18/718,215

(22) PCT Filed: Dec. 19, 2022

(86) PCT No.: PCT/EP2022/086603
§ 371 (c)(1),
(2) Date: Jun. 10, 2024

(87) PCT Pub. No.: WO2023/117870
PCT Pub. Date: Jun. 29, 2023

(65) Prior Publication Data

US 2025/0051097 A1 Feb. 13, 2025

(30) Foreign Application Priority Data

Dec. 21, 2021 (NO) .................................... 20211568

(51) Int. Cl.
*B65G 1/06* (2006.01)
*B65G 1/04* (2006.01)
*B65G 65/23* (2006.01)

(52) U.S. Cl.
CPC ........... *B65G 1/065* (2013.01); *B65G 1/0464* (2013.01); *B65G 65/23* (2013.01)

(58) Field of Classification Search
CPC ...... B65G 1/065; B65G 1/0464; B65G 65/23; B65G 1/0478; B65G 1/04; B65G 1/137; B65F 1/14
See application file for complete search history.

(56) References Cited

U.S. PATENT DOCUMENTS 10,654,661 B2 * 5/2020 Hognaland ............... B08B 1/30
11,104,527 B1 8/2021 Zhao et al.
(Continued)

FOREIGN PATENT DOCUMENTS

CN 104925543 A 9/2015
CN 112262089 A 1/2021
(Continued)

OTHER PUBLICATIONS

Tone Julseth Paulsen, Norwegian Search Report for U.S. Appl. No. 20/211,568, Jun. 30, 2022, 3 pages.
(Continued)

*Primary Examiner* — Thomas C Diaz
(74) *Attorney, Agent, or Firm* — Baker Botts L.L.P.

(57) ABSTRACT

An automated storage and retrieval system comprising an arrangement and system for the disposal of and/or recycling of trash, such as packaging materials, recyclable materials or other refuse The container handling vehicles of the system transport trash in a trash container from an access station, along the rail system of the storage system, to a trash port which has means for emptying the trash and advantageously diverting the trash to an appropriate receptacle.

8 Claims, 5 Drawing Sheets

(56) References Cited

U.S. PATENT DOCUMENTS

| | | | | |
|---|---|---|---|---|
| 12,486,112 | B2 * | 12/2025 | Langen | B65G 1/0464 |
| 2019/0031446 | A1 | 1/2019 | Hognaland | |
| 2020/0086349 | A1 | 3/2020 | Han | |
| 2020/0346864 | A1 * | 11/2020 | Fjeldheim | B66C 1/101 |

FOREIGN PATENT DOCUMENTS

| | | | |
|---|---|---|---|
| EP | 0589101 | A1 | 3/1994 |
| EP | 2148208 | A2 | 1/2010 |
| JP | H03297701 | A | 12/1991 |
| JP | H04292303 | A | 10/1992 |
| JP | H06171861 | A | 6/1994 |
| WO | 2014195901 | A1 | 12/2014 |
| WO | 2019238641 | A1 | 12/2019 |
| WO | 2020109495 | A1 | 6/2020 |
| WO | 2020249331 | A1 | 12/2020 |

OTHER PUBLICATIONS

Tone Julseth Paulsen, Office Action in Norwegian U.S. Appl. No. 20/211,568, Jul. 1, 2022, 4 pages.
Tone Julseth Paulsen, Office Action in Norwegian U.S. Appl. No. 20/211,568, Feb. 16, 2023, 2 pages.
International Searching Authority, International Search Report and Written Opinion for Application No. PCT/EP2022/086603, Apr. 3, 2023, 13 pages.

* cited by examiner

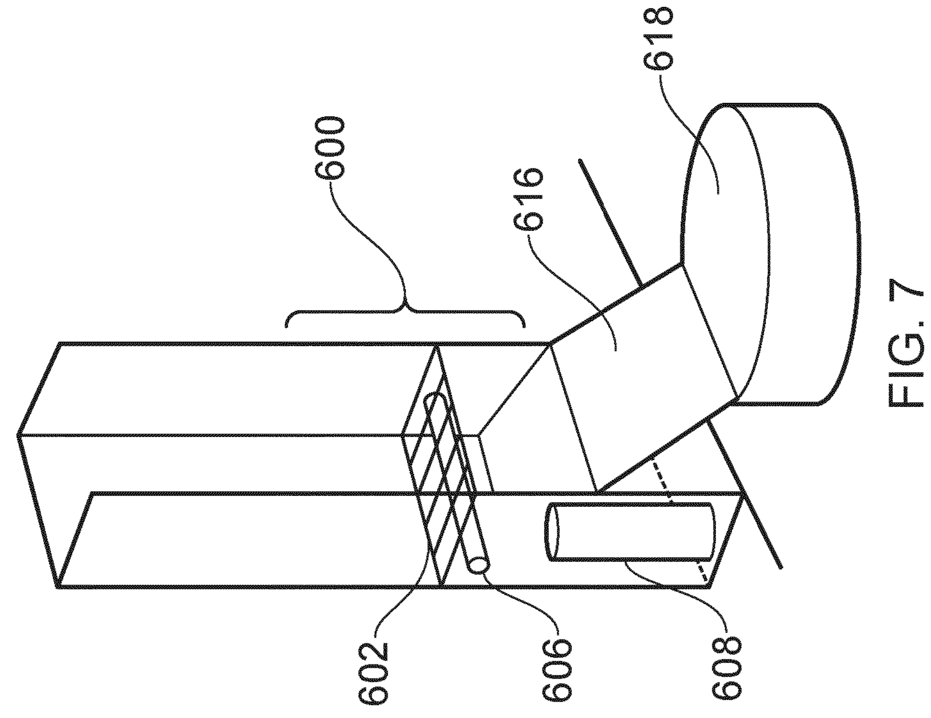
FIG. 7
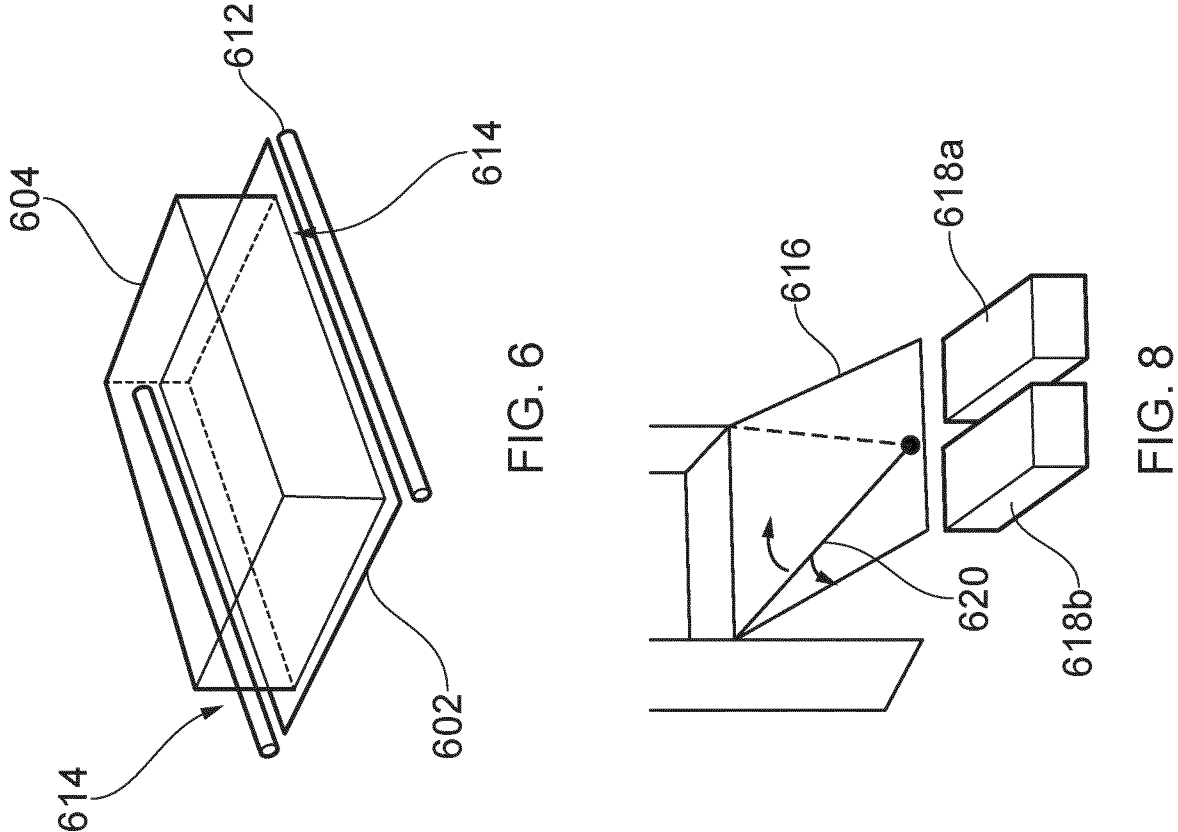
FIG. 6
FIG. 8

TRASH HANDLING ARRANGEMENT FOR AN AUTOMATED STORAGE SYSTEM

FIELD OF THE INVENTION

The present invention relates to an automated storage and retrieval system for storage and retrieval of containers, in particular to an arrangement for the handling and disposal of refuse or recyclable material generated during the operation of such a system.

BACKGROUND AND PRIOR ART

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201,301,401 comprises a vehicle body 201*a*, 301*a*, 401*a* and first and second sets of wheels 201*b*,201*c*,301*b*, 301*c*, 401*b*,401*c* which enable the lateral movement of the container handling vehicles 201,301,401 in the X direction and in the Y direction, respectively. In FIGS. 2, 3 and 4 two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*,301*b*,401*b* and/or the second set of wheels 201*c*, 301*c*,401*c* can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body 201*a* in FIG. 2 and is thus not shown.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201*a*, 401*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail 110, 111 may comprise two parallel tracks. In other rail systems 108, each rail in one direction (e.g. an X direction) may comprise one track and each rail in the other, perpendicular direction (e.g. a Y direction) may comprise two tracks. Each rail 110, 111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119, 120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106, and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

Disposal of Packaging Materials

In an automated storage and retrieval system as described above, it is often necessary to replenish the stock kept on hand by filling the storage containers with the items to maintain a certain stock level. This is called "goods in" or replenishment. In many instances the items arrive at the facility in cardboard boxes or similar packaging. This packaging requires disposal once the items are removed from the packaging and placed in the storage containers, typically by an operator at an access station. This disposal often requires a large trash receptacle adjacent to the access station that must be regularly emptied, and that also occupies valuable floor space near the access station. By the term "trash", it is meant to include terms like "refuse", "rubbish", "waste" or a similar term to indicate products and packaging or the like that are surplus to goods being stored. The same concerns apply when the packaging material is to be recycled, in which case separate receptacles would be provided at the access station for paper packaging and plastic packaging for example. Refuse or recyclable materials can of course originate from other sources as well.

SUMMARY OF THE INVENTION

The present invention is set forth and characterized in the independent claims, while the dependent claims describe other characteristics of the invention.

In one aspect, the invention is related to an automated storage and retrieval system comprising an arrangement and system for the disposal of and/or recycling of packaging materials or other refuse (hereafter generically referred to as "trash").

In one aspect, the invention concerns an automated storage and retrieval system of the type described in the background section of this application, wherein container handling vehicles of the system transport trash from an access station to a dedicated trash port.

In one aspect, the system is arranged such that an operator at the access station places the trash in an empty container of the type described in the background section (hereafter referred to as a "trash container"), the container handling vehicle lifts the trash container to the top level of the framework structure, transports the trash container to a port dedicated to trash disposal (hereafter "trash port"), the trash port comprising a rotatable platform upon which the trash container is lowered and locked into place, whereupon the platform inverts, spilling the contents of the trash bin into an appropriate receptacle.

In one aspect, a ramp is provided in connection with the trash port, such that the emptied trash slides down into the receptacle.

In one aspect, the receptacle is a trash compactor.

In one aspect, separate containers are filled at the access station with different recyclable materials and delivered to separate trash ports, each dedicated to a different type of material, for example one trash port dedicated to paper, one dedicated to plastic, and one dedicated to general refuse.

In one aspect, a single trash port is employed for trash disposal of different material types, but where the ramp comprises a diverter mechanism that guides different materials to different receptacles.

BRIEF DESCRIPTION OF THE DRAWINGS

Following drawings are appended to facilitate the understanding of the invention. The drawings show embodiments of the invention, which will now be described by way of example only, where:

FIG. 6 shows a platform with locking mechanism for locking trach containers in place.

FIG. 7 shows a trash port with invertible platform, and ramp leading to a trash receptacle.

FIG. 8 shows a ramp with diverter mechanism that is movable in order to lead trash to different receptacles.

DETAILED DESCRIPTION OF THE INVENTION

Figure 1:
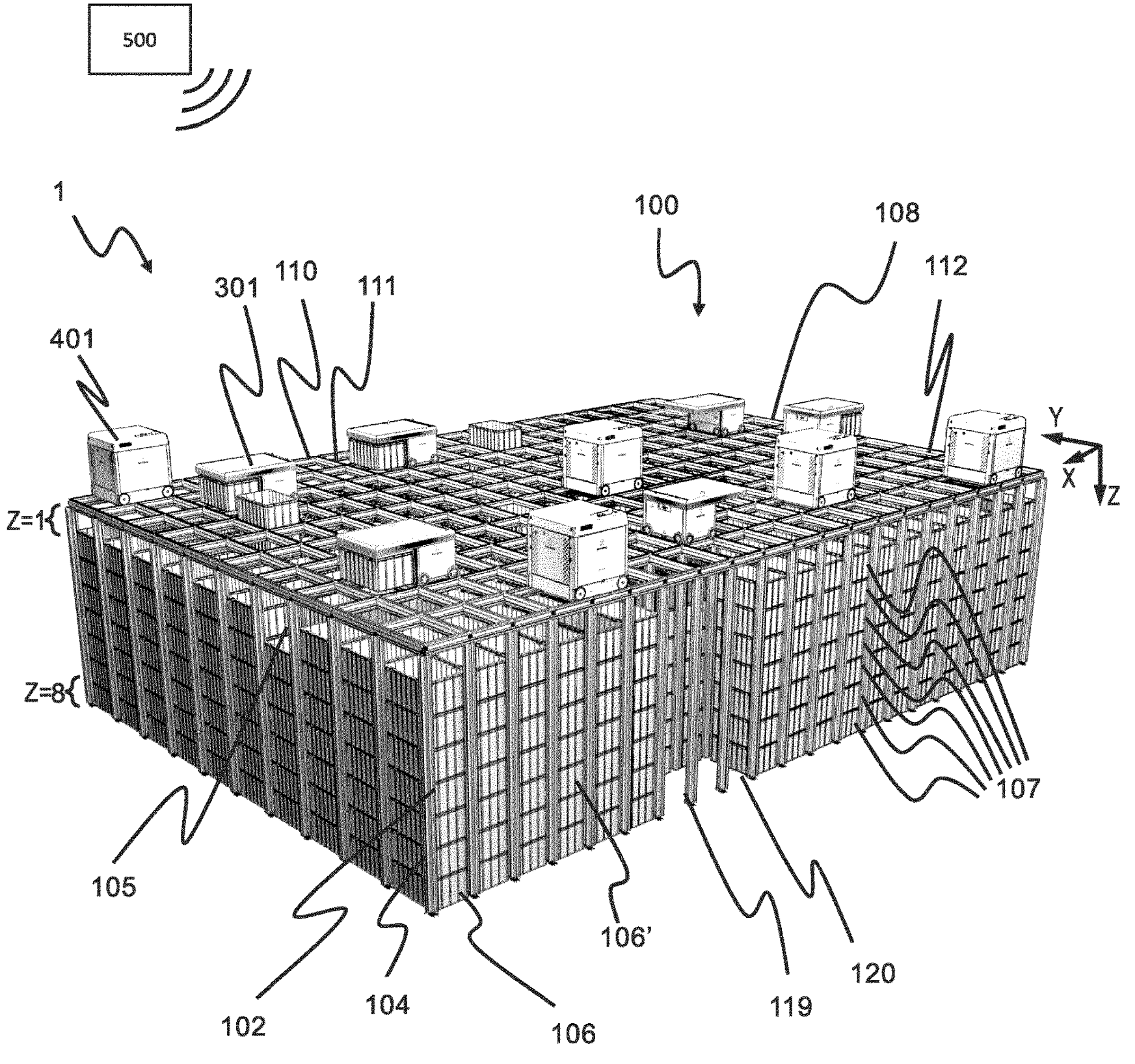
FIG. 1 is a perspective view of a framework structure of a prior art automated storage and retrieval system.
Figure 2:
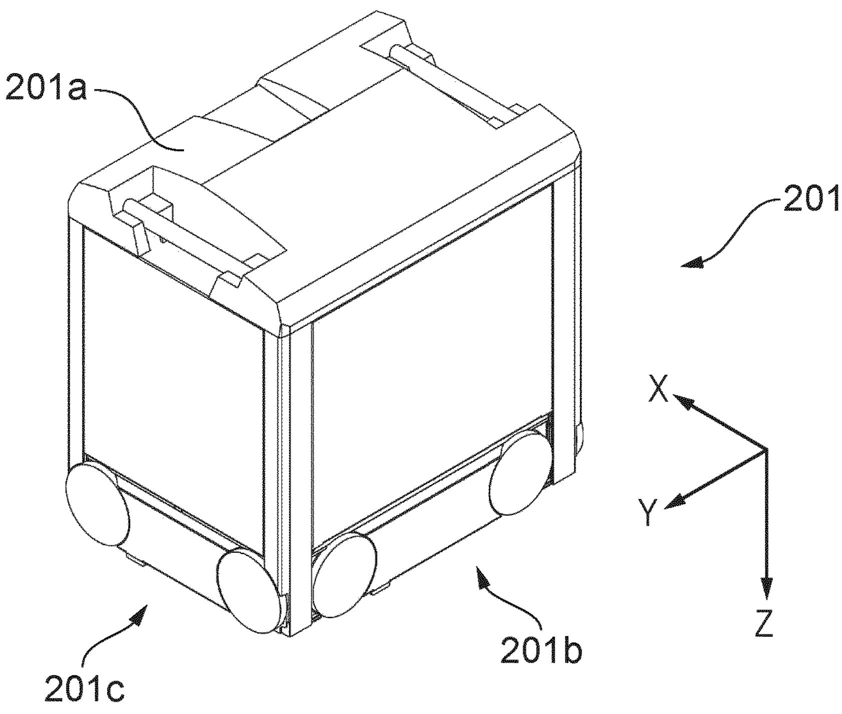
FIG. 2 is a perspective view of a prior art container handling vehicle having an internally arranged cavity for carrying storage containers therein.
Figure 3:
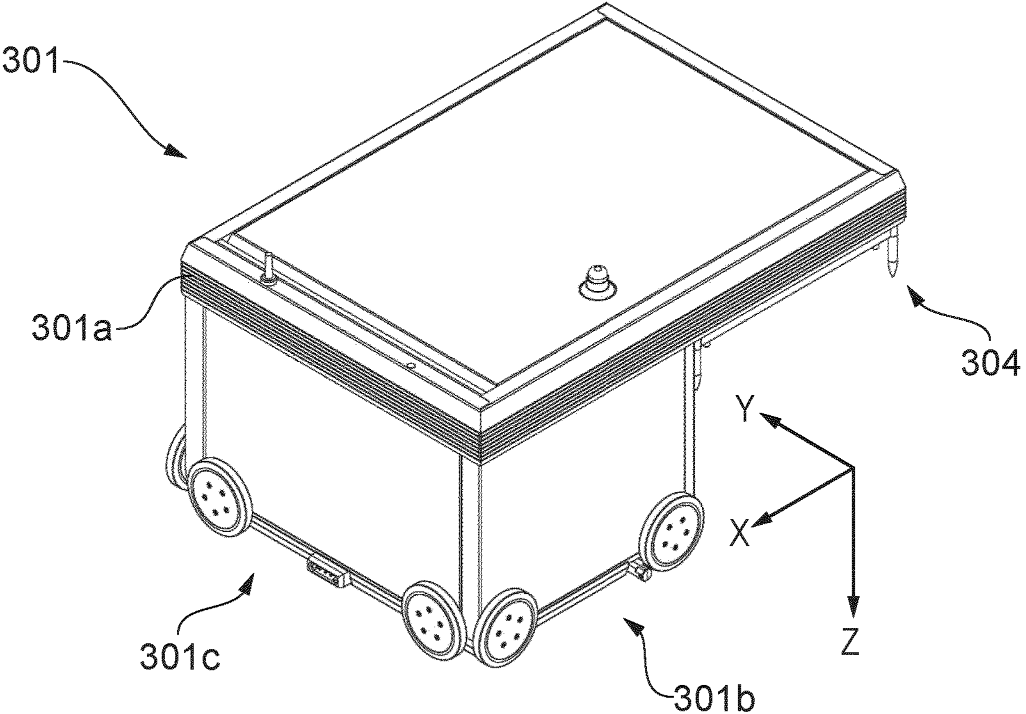
FIG. 3 is a perspective view of a prior art container handling vehicle having a cantilever for carrying storage containers underneath.
Figure 4:
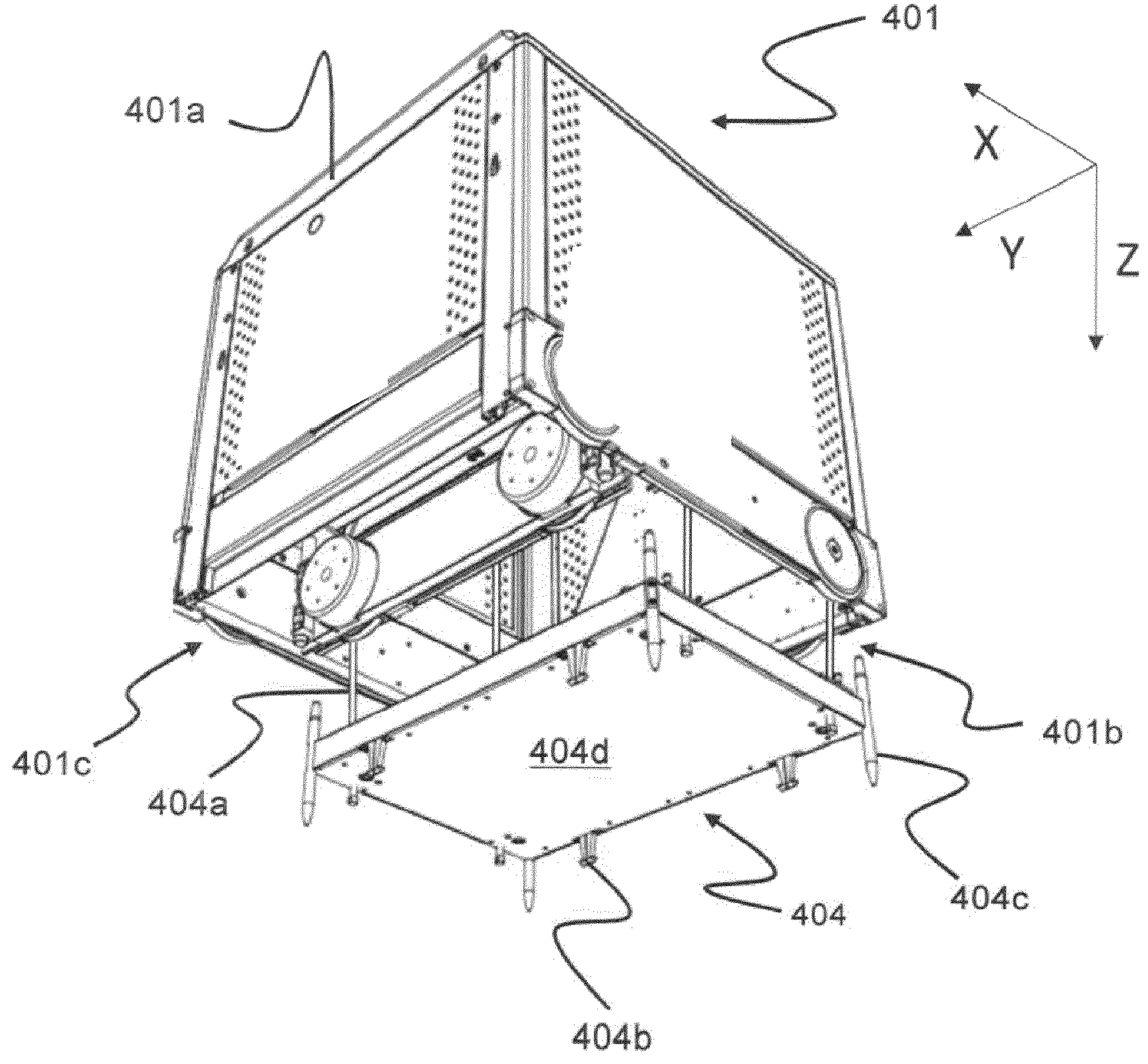
FIG. 4 is a perspective view, seen from below, of a prior art container handling vehicle having an internally arranged cavity for carrying storage containers therein.

In the following, embodiments of the invention will be discussed in more detail with reference to the appended drawings. It should be understood, however, that the drawings are not intended to limit the invention to the subject-matter depicted in the drawings.

The invention comprises an automatic storage and retrieval system as described in the background section of this application, with the addition of the aspects related to trash disposal as described hereafter.

The framework structure 100 of the automated storage and retrieval system 1 is constructed in a similar manner to the prior art framework structure 100 described above in connection with FIGS. 1-4. That is, the framework structure 100 comprises a number of upright members 102, and comprises a first, upper rail system 108 extending in the X direction and Y direction.

The framework structure 100 further comprises storage compartments in the form of storage columns 105 provided between the members 102 wherein storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 5-8.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

Figure 5:
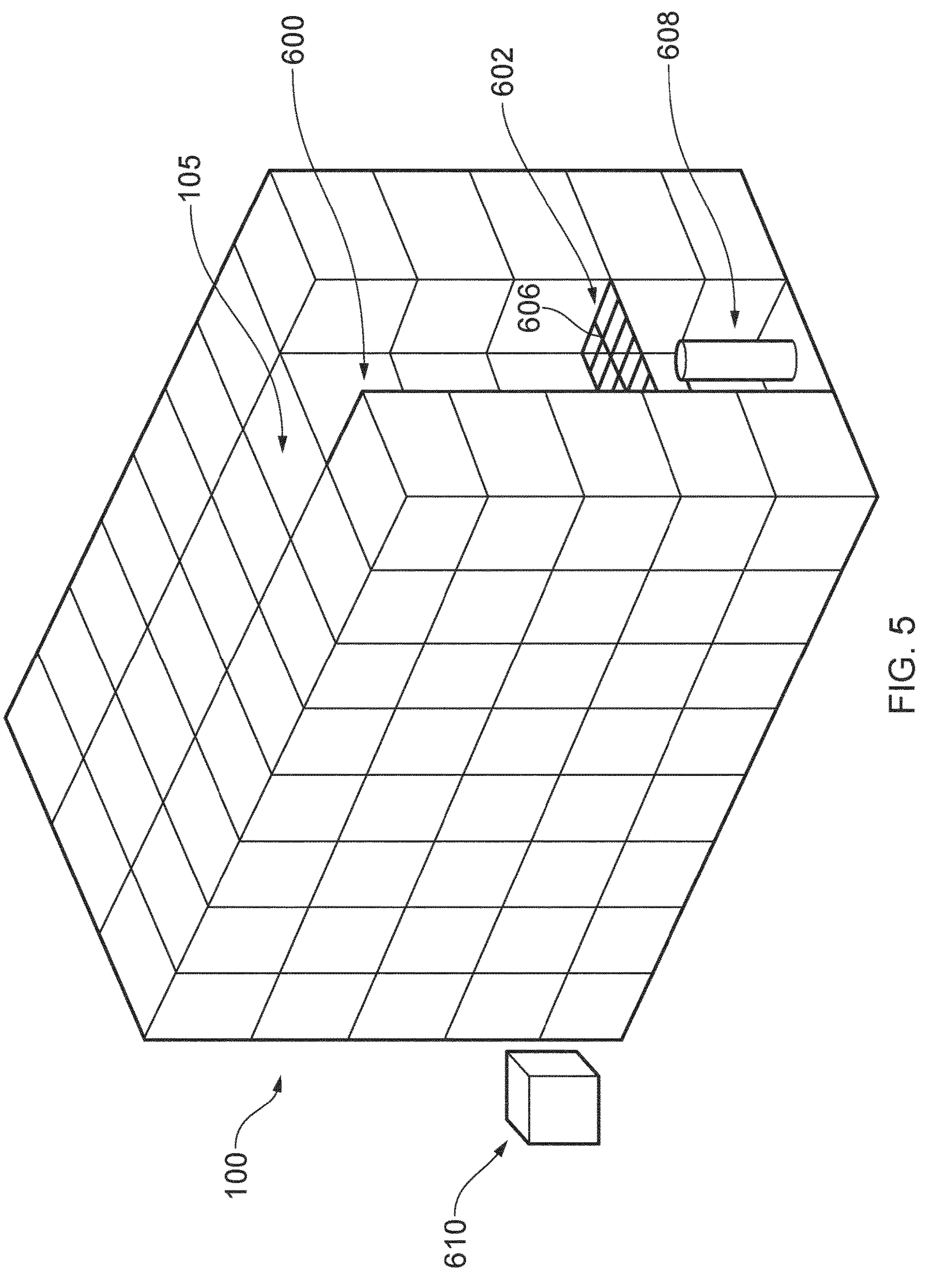
FIG. 5. is a schematic representation an automated storage and retrieval system showing a dedicated trash port located at a distance from an access station.

As shown in FIG. 5, a framework structure of an automated storage and retrieval system comprises a plurality of storage columns 105. According to the present invention, the space that would otherwise be occupied by one or more of such storage columns is configured and utilized as a trash port 600. The trash port 600 may be designated in the system as being solely for the purposes of trash removal.

The trash port 600 thus has the same vertical height and lateral dimensions as a storage column 105, and can thus be accessed by a container handling vehicle in the same manner as a storage column. Trash port 600 is provided with a platform 602 arranged at a vertical height in the trash port. Platform 602 is arranged to receive a storage container lowered thereupon by a container handling vehicle, and comprises means to lock the storage container into place. In connection with the present invention, the containers that are contemplated for use with trash disposal arrangement are to be filled with trash, and are thus designated in the system as trash containers 604. The platform 602 further is arranged to invert, so as to spill out the contents of the trash container 604. In one embodiment, platform 602 is arranged to invert via rotation about an axle 606. The trash port thus comprises a motor assembly 608, schematically represented in FIG. 5, which can be arranged as understood by one skilled in the art. In use, an operator at an access station will fill a trash container 604 with trash. As explained above, the term "trash" should be understood to encompass refuse as well as material intended for recycling such as paper or plastic. The trash inserted into the trash container will often originate from packing materials from new goods used to restock or "replenish" the automated storage and retrieval system. A container handling vehicle 201/301/401 of the system will retrieve the trash container from the access station, and transport the trash container along the rail system 108 of the framework structure 100 to the trash port 600. The container handling vehicle will thereafter lower the trash container 604 onto platform 602.

As shown in FIG. 6, platform 602 is equipped with means to lock the trash container 604 into place. In one embodiment, these means comprise two rotating members 612 comprising hooks 614, arranged to engage with the trash container 604 when the rotating member are caused to rotate inwardly. The inward rotation may be powered by motor assembly 608 or in other ways understood by one skilled in the art.

FIG. 7 illustrates an embodiment where the trash port 600 is arranged in conjunction with a ramp 616 leading to a receptacle 618. In one embodiment, receptacle 618 is a trash compactor. As can be appreciated from FIGS. 6 and 7, a trash container 604 that is lowered onto platform 602 will be locked into place by activation of rotating members 612, whereby hooks 601 engage trash container 604. Platform 602 is thereafter caused to rotate about axle 606, thereby inverting trash container 604 and spilling its contents onto ramp 616 which leads the contents into receptacle 618. This provides the advantage, among others, of being able to locate receptacle 618 at a convenient distance from access station 610, thereby avoiding utilization of valuable floor space in the vicinity of access station 610 for the receptacle.

FIG. 8 illustrates an embodiment where ramp 616 is provided with a diverter mechanism 620. In one embodiment, diverter mechanism 620 is a movable partition, movable between a first position in which contents descending ramp 616 are directed to a first receptacle 618*a* and second position in which contents descending the ramp are directed into a second receptacle 618*b*. For example, first receptacle 618*a* may be designated for recyclable paper material while receptacle 618*b* may be designated for recyclable plastic material. In connection with this embodiment, the operator at the access station may fill different trash containers 604 with different materials, and identify the nature of the materials to the control system 500. The control system will cause the diverter mechanism 620 to move into the correct position in order to direct the contents of the trash container to the intended receptacle.

LIST OF REFERENCE NUMBERS

Prior Art (FIGS. 1-4)

1 Prior art automated storage and retrieval system
100 Framework structure
102 Upright members of framework structure
104 Storage grid
105 Storage column
106 Storage container
106' Particular position of storage container
107 Stack
108 Rail system
110 Parallel rails in first direction (X)
112 Access opening
119 First port column
120 Second port column
201 Prior art container handling vehicle
201*a* Vehicle body of the container handling vehicle 201
201*b* Drive means/wheel arrangement/first set of wheels in first direction (X)
201*c* Drive means/wheel arrangement/second set of wheels in second direction (Y)
301 Prior art cantilever container handling vehicle
301*a* Vehicle body of the container handling vehicle 301
301*b* Drive means/first set of wheels in first direction (X)
301*c* Drive means/second set of wheels in second direction (Y)
304 Gripping device
401 Prior art container handling vehicle
401*a* Vehicle body of the container handling vehicle 401
401*b* Drive means/first set of wheels in first direction (X)
401*c* Drive means/second set of wheels in second direction (Y)
404 Gripping device
404*a* Lifting band
404*b* Gripper
404*c* Guide pin
404*d* Lifting frame
500 Control system
X First direction
Y Second direction
Z Third direction

FIGS. 5-8

600 trash port
602 platform
604 trash container
606 axle
608 motor assembly
610 access station
612 rotating member
614 hook
616 ramp
618 receptacle
618*a* first receptacle
618*b* second receptacle
620 diverter mechanism

The invention claimed is:

1. An automated storage and retrieval system (1) having a trash disposal arrangement, comprising:

a. a storage grid (104) provided by a framework structure (100), the framework structure (100) comprising a rail system (108) arranged at an upper level of the framework structure, the rail system comprising a first set of parallel rails (110) arranged in a horizontal plane (P) and extending in a first direction (X), and a second set of parallel rails (111) arranged in the horizontal plane (P) and extending in a second direction (Y) which is orthogonal to the first direction (X), which first and second sets of rails (110, 111) form a grid pattern in the horizontal plane (P) comprising a plurality of adjacent grid cells (112), and the storage grid defining a plurality of storage columns (105), each storage column being arranged to store a respective stack (107) of storage containers (106), wherein the storage columns (105) are located beneath the rail system (108) and wherein each storage column (105) is located vertically below a respective grid cell (112), b. a plurality of container handling vehicles (201/301/401) that operate on the rail system (108) for collecting and returning storage containers (106) to and from storage columns (105), c. one or more trash ports (600), the one or more trash ports arranged as vertical columns located below respective grid cells (112), d. means in connection with the one or more trash ports (600) for receiving a trash container (604) in the form of a storage container (106) containing trash from a container handling vehicle of the plurality of container handling vehicles and thereafter emptying the trash container into a receptacle.

2. The automated storage and retrieval system (1) having the trash disposal arrangement according to claim 1, wherein the means for receiving and emptying the trash container (604) comprises:

a. an invertible platform (602) arranged in the one or more trash ports (600), the invertible platform arranged to receive the trash container (604) lowered by the container handling vehicle (201,301,401) of the plurality of container handling vehicles, b. the invertible platform (602) comprising means to lock the trash container into place and means to invert the trash container, such that the contents of the trash container will be emptied into a receptacle (618).

3. The automated storage and retrieval system (1) having the trash disposal arrangement according to claim 2, wherein the means to invert the platform (602) comprises a rotatable axle (606) connected to and arranged to rotate and invert the platform.

4. The automated storage and retrieval system (1) the trash disposal arrangement according to claim 2, wherein the means to lock the trash container into place comprises one or more rotating members (612) arranged in connection with the platform (602), the rotating members comprising hooks (614) arranged to engage the trash container (604).

5. The automated storage and retrieval system (1) having the trash disposal arrangement according to claim 2, further comprising at least one ramp (616) positioned in relation to the one or more trash ports (600) so as to lead trash from the inverted trash container to the receptacle.

6. The automated storage and retrieval system (1) having the trash disposal arrangement according to claim 5, wherein the system comprises a first receptacle (618*a*) for receiving a first type of trash and a second receptacle (618*b*) for receiving a second type of trash, and wherein the ramp (616) comprises a diverter mechanism (620) arranged to selectively divert trash descending the ramp to either the first receptacle (618*a*) or the second receptacle (618*b*).

7. A method for disposing trash in an automated storage and retrieval system (1) comprising:

a. a storage grid (104) provided by a framework structure (100), the framework structure (100) comprising a rail system (108) arranged at an upper level of the framework structure, the rail system comprising a first set of parallel rails (110) arranged in a horizontal plane (P) and extending in a first direction (X), and a second set of parallel rails (111) arranged in the horizontal plane (P) and extending in a second direction (Y) which is orthogonal to the first direction (X), which first and second sets of rails (110, 111) form a grid pattern in the horizontal plane (P) comprising a plurality of adjacent grid cells (112), and the storage grid defining a plurality of storage columns (105), each storage column being arranged to store a respective stack (107) of storage containers (106), wherein the storage columns (105) are located beneath the rail system (108) and wherein each storage column (105) is located vertically below a respective grid cell (112), b. a plurality of container handling vehicles (201/301/401) that operate on the rail system (108) for collecting and returning storage containers (106) to and from storage columns (105), c. one or more trash ports (600), the one or more trash ports arranged as vertical columns located below respective grid cells (112), d. means in connection with the one or more trash ports (600) for receiving a trash container (604) in the form of a storage container (106) containing trash from a container handling vehicle of the plurality of container handling vehicles and thereafter emptying the trash container into a receptacle wherein the method comprises the steps of:

filling the storage container (106) with trash at an access station (610), thereby forming the trash container (604), retrieving the trash container with the container handling vehicle (201/301/401) of the plurality of container handling vehicles, transporting the trash container along the rail system (108) to the one or more trash ports (600), lowering the trash container onto an invertible platform (602) arranged in the one or more trash ports, inverting the platform (602) so as to empty the contents of the trash container into the receptacle (618).

8. The method according to claim 7, further comprising the step of locking the trash container onto the platform prior to inversion.

* * * * *